United States Patent [19]
Lee

[11] Patent Number: 5,751,332
[45] Date of Patent: May 12, 1998

[54] CIRCUIT FOR GENERATING STROBE SIGNALS TO LED PRINT HEAD

[75] Inventor: Kyung-Young Lee, Suwon, Rep. of Korea

[73] Assignee: SamSung Electronics Co., Ltd., Suwon, Rep. of Korea

[21] Appl. No.: 110,228

[22] Filed: Aug. 23, 1993

[30] Foreign Application Priority Data

Aug. 22, 1992 [KR] Rep. of Korea .................. 1992-15139

[51] Int. Cl.$^6$ .......................... B41J 2/47; H04N 1/23
[52] U.S. Cl. ..................... 347/240; 347/900; 358/298
[58] Field of Search ........................ 347/237, 900, 347/132, 240, 131, 183; 358/298, 302

[56] References Cited

U.S. PATENT DOCUMENTS 4,806,949 2/1989 Onuma et al. .................. 358/298 X

OTHER PUBLICATIONS

Mano, M. Morris, *Digital Design*, Prentice–Hall, Inc., Englewood Cliffs, New Jersey, 1984, pp. 172 and 356–357.

*Primary Examiner*—David F. Yockey
*Attorney, Agent, or Firm*—Robert E. Bushnell, Esq.

[57] ABSTRACT

A circuit for generating strobe signals to one line light emitting diode arrays of an light emitting diode print head, comprises: a portion for generating a start signal in response to a clock signal, a start pulse, and a synchronization pulse of a central processing unit; a counter for generating a counter signal indicative of counts of the clock signals initiated in response to the start signal; a comparator for comparing the counter signal and strobe period selection signals indicative of a selected period of the strobe signals, and for generating a comparator signal indicative of the comparison; a clock controller for generating a gating clock controlling length of the strobe signals by latching the comparator signal; a signal output portion for generating individual ones of the strobe signals in response to strobe control signals, the strobe signals having lengths determined by the gating clock; and a strobe controller for generating the strobe control signals by latching the gating clock received from the signal output portion. Consequently, strobe signal generation is accomplished without the continuous control of the central processing unit.

23 Claims, 4 Drawing Sheets

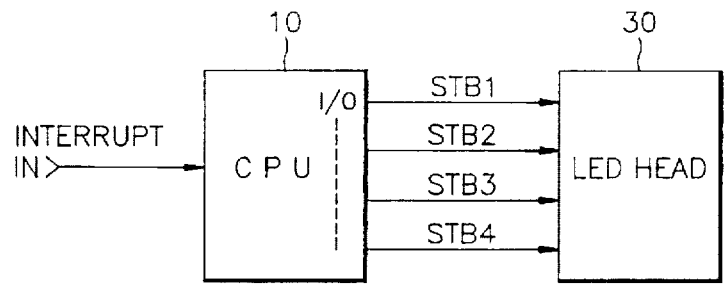
FIG. 3
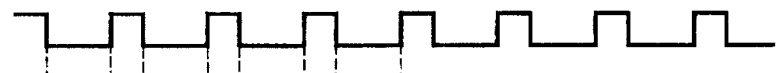
FIG. 5A (G)
FIG. 5B (A)
FIG. 5C (B)
FIG. 5D (STB1)
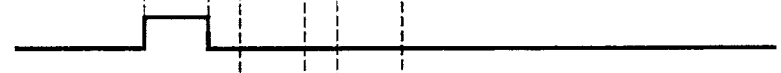
FIG. 5E (STB2)
FIG. 5F (STB3)
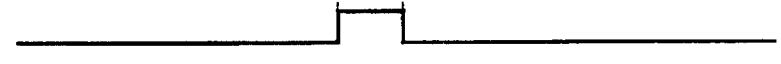
FIG. 5G (STB4)

CIRCUIT FOR GENERATING STROBE SIGNALS TO LED PRINT HEAD

FIELD OF THE INVENTION

The present invention relates to a light-emission control circuit of a printing device and, more particularly, to a circuit for generating strobe signals in a laser printer to control a light emitting diode, LED, head directly and independently of a central processing unit's control.

BACKGROUND OF THE INVENTION

Laser printers have rotating photosensitive drums that are selectively illuminated by an LED print head in response to print data. The exposure of the photosensitive drum generates a latent electrostatic image on its surface. This latent electrostatic image is then developed by exposing the photosensitive drum to toner which adheres to the charged portions of the photosensitive drum. The toner on the photosensitive drum is then transferred to paper where it is fused by a fuser unit.

The print data is provided from a central processing unit to the LED print head where it is latched. Then, arrays of light emitting diodes in the LED head are driven in response to the latched print data when strobe signals are received. Conventionally, these strobe signals are generated by the laser printer's a central processing unit and, specifically, at the input/output ports.

Configuring the laser printer so that the strobe signals are generated by the central processing unit's input/output ports has a number of drawbacks. First, this configuration excessively burdens the central processing unit thereby slowing its other functions such as data processing and communications with a host computer. Moreover, a number of input/output ports of the central processing unit must be dedicated to the strobe signal generation. Thus, these ports are not available for other functions necessitating either a larger central processing unit or slowing its operation.

SUMMARY OF THE INVENTION

Accordingly, it is an object of the present invention to provide an improved light emission control circuit.

It is another object to provide a light emission control circuit that improves the conventional LED head light emission control technique.

It is yet another object of the present invention to provide a light-emission control circuit that directly controls LED head without controlling of a controller such as a CPU.

According, these and other objects may be achieved according to the principles of the present invention with a circuit for generating strobe signals to one line light emitting diode arrays of an light emitting diode print head. This envisions a portion for generating a start signal in response to a clock signal, a start pulse, and a synchronization pulse; a counter for generating a counter signal indicative of counts of the clock signals initiated in response to the start signal; a comparator for comparing the counter signal and strobe period selection signals indicative of a selected period of the strobe signals, and for generating a comparator signal indicative of the comparison; a clock controller for generating a gating clock controlling length of the strobe signals by latching the comparator signal; a signal output portion for generating individual ones of the strobe signals in response to strobe control signals, the strobe signals having lengths determined by the gating clock; and a strobe controller for generating the strobe control signals by latching the gating clock received from the signal output portion.

BRIEF DESCRIPTION OF THE DRAWINGS

The above objects and other advantages of the present invention will become more apparent by way of a description of a preferred embodiment of the present invention with reference to the attached drawings, in which:

FIG. 3 is a block diagram illustrating a conventional configuration for proving strobe signals to an LED print head;

FIG. 5 is an timing diagram of the signals generated by the a strobe signal generating circuit of FIG. 4.

DETAILED DESCRIPTION OF THE DRAWINGS

Turning now to the drawings, the construction and operation of a conventional one line LED array will be described by reference to FIGS. 1 and 2.

Figure 1:
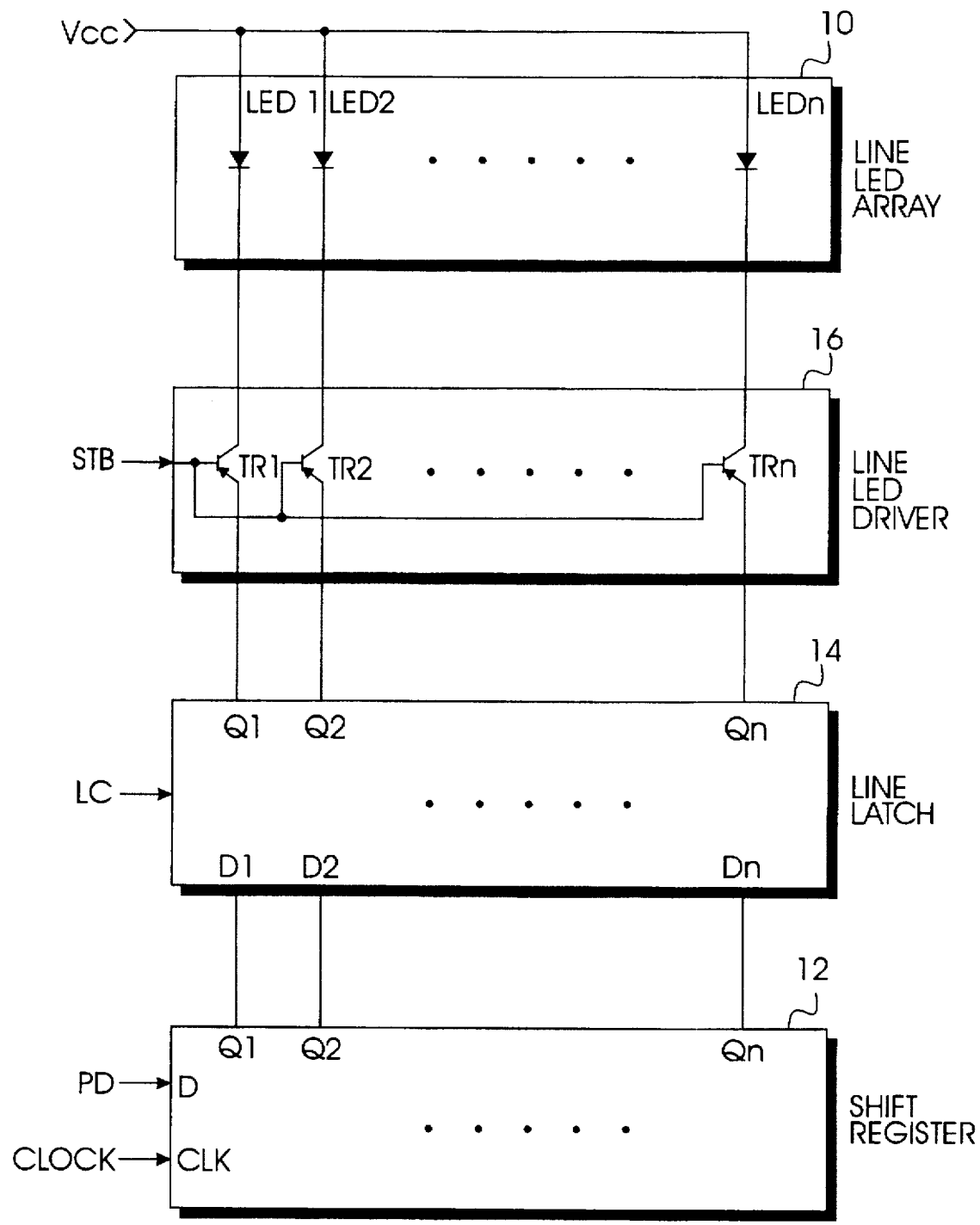
FIG. 1 is a block diagram of a circuit for driving a one line LED array.

FIG. 1 illustrates the structure of a conventional circuit for driving a line LED array 10. Specifically, one line LED array comprises four different line LED arrays, each line LED array 10 comprising a plurality of LED's, LED1–LEDn which are positioned to illuminate and expose a surface of a photo-sensitive drum (not shown). The light from each LED LEDn–LED1 causes the formation of a local electrostatic charge on the photosensitive drum which will attract and hold toner.

A shift register 12 receives a line of print data PD containing n bits in a serial format which is shifted into the shift register in response to a video clock pulses CLOCK. Once the n bits of the print data PD have been loaded into the shift register, they are provided in parallel to the output ports Qn–Q1 of the shift register 12. A line latch 14 then latches the parallel print data provided by the shift register 12 in response to a latch clock pulse LC. The latching of the print data causes each output terminal, Qn–Q1, of the line latch 14 to enter a logic high or a logic low state in dependence upon the corresponding bit of the latched print data. A line LED driver 16 comprises a plurality of transistors TRn–TR1 connected between corresponding anodes of the LED's LEDn–LED1 of the one line LED array 10 and an output terminal of the line latch 14. The cathodes of the LED's LED1–LEDn are connected to the source voltage $V_{cc}$.

The photosensitive drum is finally exposed when a strobe signal STB is provided to a line LED driver 16 and specifically to bases of bipolar junction transistors TRn–TR1. That is, when the strobe signal STB enters a high state, each of the transistors TRn–TR1 is rendered conductive so that the LED's LEDn–LED1 of the line LED array 10 are selectively driven in dependence upon the print data latched in the line latch 14. For example, if the terminal D1 of the line latch 14 is a logic "0", LED1 will be driven when the strobe signal STB enters the high state. Once the strobe signal STB returns to a low state, the drum will be advanced so that a next region of the drum can be exposed in response to a next line of print data.

Figure 2:
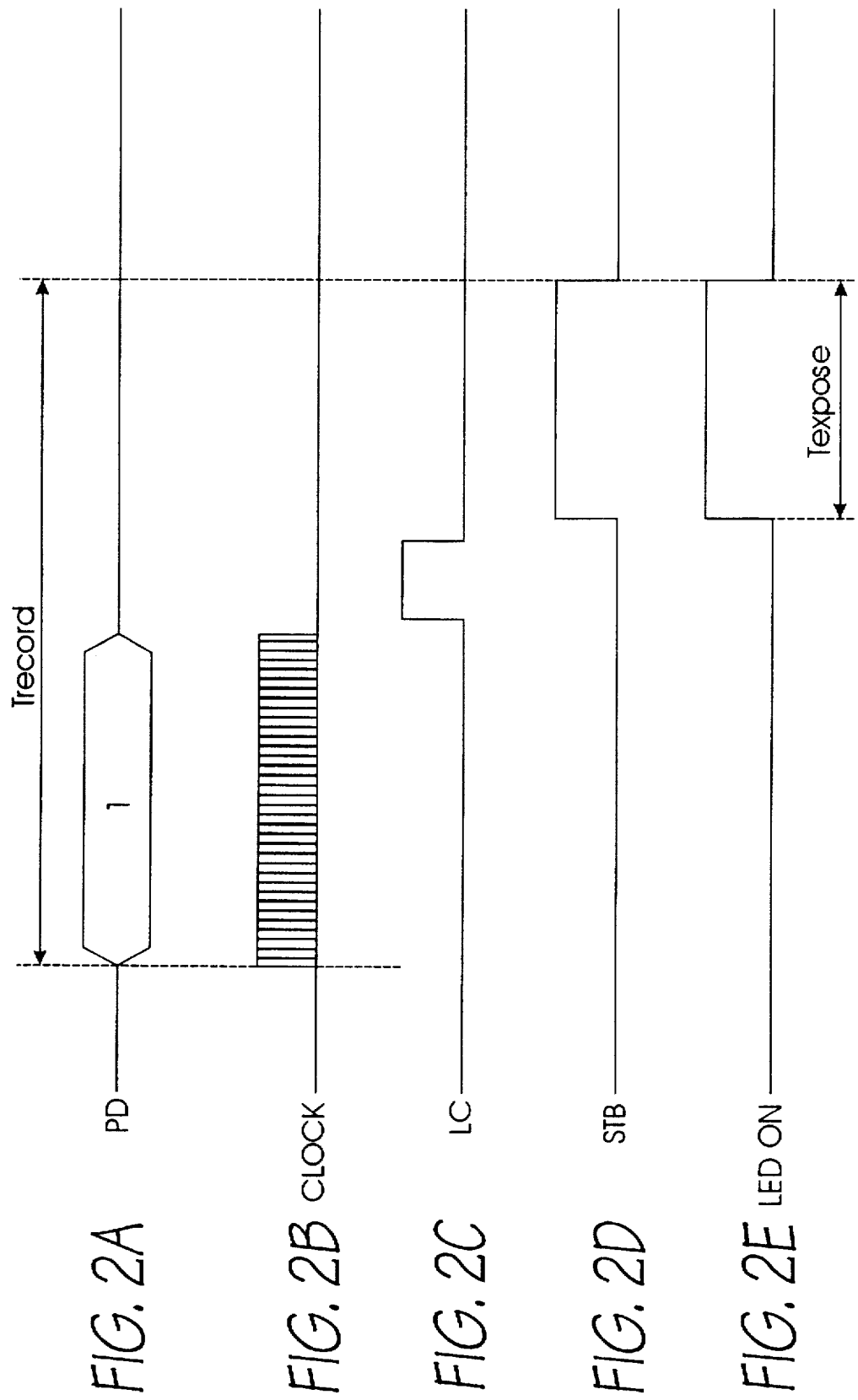
FIG. 2 is a timing diagram of signals controlling the one line LED array of FIG. 1 according to a conventional technique.

FIG. 2 illustrates the signals for driving the line LED array 10 of FIG. 1. Specifically, the print data PD is shifted into the shift register 12 in response to the video clock pulses CLOCK. Once this print data PD is completely shifted into the shift register 12, the latch clock pulse LC enters a high state so that the print data of the shift register 12 is latched in the line latch 14. When this print data PD is latched in the line latch 14, the strobe signal STB enters a high state so that the LED's LEDn–LED1 in the line LED array 10 can be selectively driven in response to the print data latched in the line latch 14.

A line print period Trecord represents the time necessary for printing one line of the print data PD. A full exposure time period Texpose represents the time for which the LED's must be driven to charge the photo-sensitive drum.

FIG. 3 illustrates a conventional configuration for generating strobe signals to an LED print head. In the conventional configuration, a central processing unit CPU generates strobe signals STB1–STB4 to an LED print head 30 having one line LED array which comprises four different groups of LEDs in different line LED arrays of the type illustrated in FIG. 1 each receiving a different one of the strobe signals STB1–STB4. Specifically, each one of the four different line LED arrays of the LED print head 30 receives a different one of the strobe signals STB1–STB4 as a strobe signal STB illustrated in FIG. 1 so that the different one line LED arrays may be sequentially driven.

In the conventional configuration, the strobe signals STB1–STB4 are generated by the input/output ports I/O of the central processing unit CPU in response to receipt of an interrupt signal IN. That is, when the central processing unit CPU receives the interrupt signal, it generates the strobe signals STB1–STB4 which are supplied to different ones of the four one line LED arrays contained in the LED print head 30.

As described above, in the conventional configuration, four input/output ports of the central processing unit CPU are dedicated to controlling the LED print head 30. As a result, fewer input/output ports are available for other functions. Also, the conventional configuration slows down the overall operations of the central processing unit 30 since its machine cycles are consumed to generate the strobe signals. Therefore, the central processing unit 30 requires more time to perform its other operations such as data processing and maintaining the communications link with the host computer. Consequently, the conventional configuration suffers from a number of deficiencies.

Figure 4:
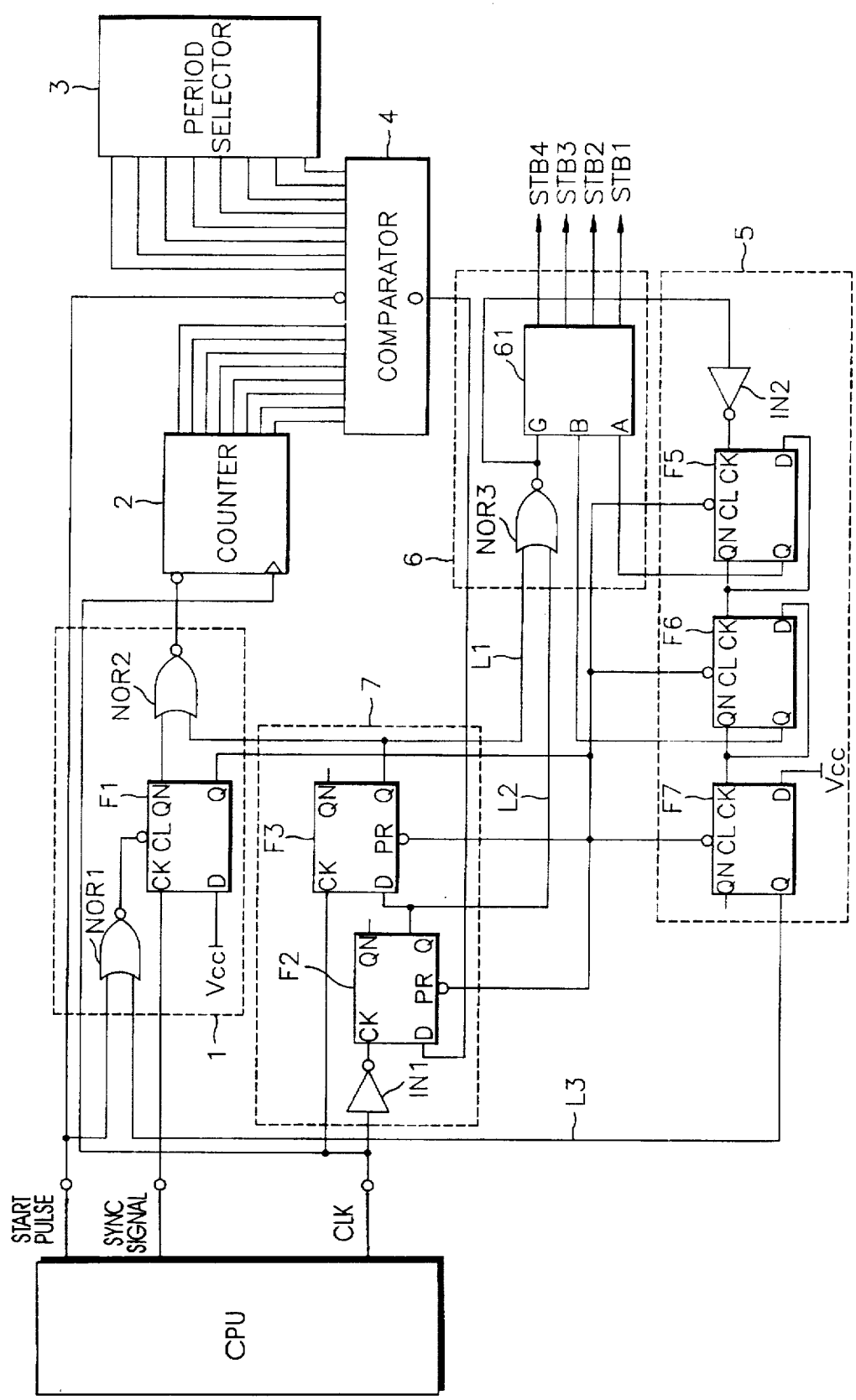
FIG. 4 is a circuit diagram showing a strobe signal generating circuit constructed according to the principles of the present invention.

Turning now to FIGS. 4 and 5, circuit and timing diagrams illustrate the construction and operation of a preferred embodiment of a strobe signal generating circuit constructed according to the principles of the present invention.

FIG. 4 illustrates a strobe signal generating circuit in which a start portion 1 generates first and second start signals. Specifically, the first start signal indicates reset and generation of the strobe signals STB1–STB4 and the second start signal controls the generation of the strobe signals STB1–STB4 individually. The start portion generates the first and second start signals in response to a clock signal CLK, a start pulse, and synchronization, SYNC, signal supplied by the central processing unit of the laser printer.

A counter 2 initiates counting of the clock signal CLK in response to the second start signal. Simultaneously, a strobe period selector 3 generates period selection signals indicative of a selected period of the strobe signals STB1–STB4. Since the strobe period selector 3 controls the length of the strobe signals, it controls the degree to which the photosensitive drum is exposed in response to print data and thus the contrast of the printed image.

A comparator 4 compares an output of the counter 2 with the period selection signals and generates a comparator signal indicative of a result of the comparison. That is, the comparator 4 generates the comparator signal when the count of the counter 2 matches the strobe period indicated by the period selection signals. A clock controller 7 latch—outputs the comparator signal from the comparator 4 in response to the clock signal CLK to enable generation of a gating clock which defines the length of the strobe signals STB1–STB4. A signal output portion 6 input-gates the output of the clock controller 7 and generates the strobe signals STB1–STB4 having the same period but different transition states. A strobe controller 5 latch—outputs the gating clock of the clock controller 7 to supply first and second strobe control signals to the signal output portion 6.

The start portion 1 comprises a first NOR logic gate NOR1 for logically combining the start pulse and an end-of-output signal generated by the strobe controller 5. A first flip-flop F1 has a clear terminal CL which is coupled to the output of the first NOR gate NOR1, a data input terminal D which is coupled to a supply voltage terminal providing a supply voltage $V_{CC}$, and clock terminal CK which receives the SYNC signal. The first flip-flop F1 latch—outputs the logic "high" signal supplied by the supply voltage terminal in response to reception of the SYNC signal at its clock terminal. A second NOR gate NOR2 generates the second start signal for indicating initiation of each of the strobe signals individually by logically combining the signal generated at the inverting output terminal of the first flip-flop F1 and a third flip-flop signal generated by the clock controller 7. The counter 2 receives the second start signal at a reset terminal and the clock signal CLK at input terminal to thereby initiate counts of the clock signal CLK in response to the second start signal.

The clock controller 7 includes a first inverter IN1 for inverting the clock signal CLK. The inverted clock signal is then received at a clock terminal CK of a second flip-flop F2. A data input terminal D of the second flip-flop F2 is connected to receive the comparator signal which it latch—outputs as a second flip-flop signal to a non-inverting output terminal Q in response to the inverted clock signal. A third flip-flop F3 receives the second flip-flop signal at its data input terminal D and the clock signal at its clock terminal CK. Consequently, the third flip-flop F3 generates the third flip flop signal onto a line L1 by latch—outputting the second flip-flop signal in response to the clock signal CLK.

The signal output portion 6 includes a third NOR gate NOR3 for logically combining the second flip-flop signal and the third flip-flop signal to generate the gating clock. A gating part 61 is connected to receive the gating clock at a first input terminal G, the first strobe control signal at a second input terminal A, and the second strobe control signal at a third input terminal B. The gating part 61 is internally configured to generate a logic high output for a period determined by the gating clock at one of four output terminals selected by the first strobe control signal and the second strobe control signal.

The strobe controller 5 has a second inverter IN2 for generating an inverted gating clock by inverting the gating clock generated by the third NOR gate NOR3. A fifth flip-flop F5 receives the inverted gating clock at a clock terminal CK and a feedback supplied output of its inverting output terminal QN into its data input terminal D, and generates the first strobe control signal at its non-inverting output Q. A sixth flip-flop F6 also receives the output of the fifth flip-flop F5's inverting output terminal QN into its clock terminal CK and a feedback—supplied output of its inverting output terminal QN into the data input terminal D. The sixth flip-flop F6 generates the second strobe control signal at its non-inverting output terminal Q. Finally, a seventh flip-flop F7 generates the end-of-output signal at its non-inverting output Q by latch—outputting a logic "high" input provided to its data input terminal D from the supply voltage terminal in response to the output generated at the inverting output QN of the sixth flip-flop F6.

The operation of the preferred embodiment will now be described in detail by reference to both FIGS. 4 and 5.

The start portion 1 is activated by the start pulse. In response to reception of the start pulse, the first flip-flop generates the first start signal at its non-inverting output terminal Q. This first start signal is an active "high" signal which activates the strobe controller 5 and the clock controller 7. Specifically, the first start signal is received at the clear terminals of the fifth, sixth, and seventh flip-flops and is also received at the preset terminals of the second and third flip-flops. The first flip-flop also generates an inverted first flip-flop signal at its inverting output terminal QN which is logically combined with the third flip-flop signal to generate the second start signal. The second start signal enables the counter 2 to initiate counting of the clock signal CLK.

The comparator 4 generates the comparator signal when the output of the counter 2 matches the period selection signals of the strobe period selector 3. In response to comparator signal, the clock controller 7 generates the simultaneously logic "low" second and third flip-flop signals which when logically combined by the third NOR gate NOR3 generate a high gating clock to thus terminate a current strobe signal. Additionally, the third flip-flop signal causes the counter 2 to reset and begin counting the clock signal CLK to time the generation of a subsequent strobe signal.

The strobe controller 5 effectively counts the transitions of the gating clock and generates the first and second strobe control signals which control the gating part 61 to successively generate each of the strobe signals STB1–STB4.

After the fourth strobe signal STB4 is generated, an end-of-output signal is generated through a line L3 to reset the start portion 1 so that another four strobe signals may be generated in response reception of a next start pulse.

Here, the gate part 61 can be realized as a plurality of NAND gates and inverters. For instance, the three inputs of the gate array 61, i.e., the gating signal, the first strobe control signal and the second strobe control signal can be simply NOR-gated by a three-input NOR gate to generate the first strobe control signal STB1. Similarly, the second strobe signal can be generated by a three input NOR gate receiving the gating signal, the second strobe control signal, and an inverted first strobe control signal.

Accordingly, in the preferred embodiment of the present invention, the strobe signals STB1–STB4 are successively generated in response to the start pulse. Thus, the central processing unit is merely responsible for the initiation of strobe signal generation rather than the generation of each of the strobe signals, individually. As a result, the processing load placed upon the central processing unit is reduced while maintaining accurate strobe signal generation.

I claim:

1. A circuit for generating strobe signals to a plurality of one line light emitting diode arrays in a light emitting diode print head of a printer having a central processing unit for supplying a start pulse, a synchronization signal and a clock signal, said circuit comprising:

means for generating a start signal in response to reception of said start pulse and said synchronization signal supplied from said central processing unit of said printer;

a counter coupled to receive said clock signal supplied from said central processing unit of said printer and said start signal, for generating a counter signal indicative of counts of said clock signal initiated in response to said start signal;

means coupled to receive said counter signal and a selected one of strobe period selection signals indicative of a selected period of said strobe signals, for comparing said counter signal and said selected one of said strobe period selection signals to generate a comparator signal;

a clock controller coupled to receive said clock signal and said comparator signal, for generating a gating clock signal to control the length of said strobe signals;

a signal output generator coupled to receive said gating clock signal and strobe control signals, for generating individual ones of said strobe signals in response to said strobe control signals to control operation of the light emitting diode arrays in the light emitting diode print head, said individual ones of said strobe signals having lengths determined by said gating clock signal; and a strobe controller coupled to receive said gating clock signal, for generating said strobe control signals to control successive generation of said strobe signals.

2. The circuit as claimed in claim 1, wherein said clock controller comprises:

a first inverter coupled to receive said clock signal, for generating an inverted clock signal by inverting said clock signal;

a first flip-flop having a clock terminal coupled to receive said inverted clock signal and a data terminal coupled to receive said comparator signal, for generating a first flip-flop signal by latching said comparator signal in response to reception of said inverted clock signal;

a second flip-flop having a clock terminal coupled to receive said clock signal and a data terminal coupled to receive said first flip-flop signal, for generating a second flip-flop signal; and a first NOR gate coupled to receive said first flip-flop signal and said second flip-flop signal, for generating said gating clock signal by logically combining said first and said second flip-flop signal.

3. The circuit as claimed in claim 2, wherein said said start signal generating means comprises:

a second NOR gate coupled to receive said start pulse and a first one of said strobe control signals, for generating a first intermediate signal by logically combining said start pulse and said first one of said strobe control signal;

a third flip-flop having a clock terminal coupled to receive said synchronization signal, a reset terminal coupled to receive said first intermediate signal and a data terminal coupled to receive a predetermined voltage, for generating a third flip-flop signal by latching said predetermined voltage in accordance with said synchronization signal upon reset by said first intermediate signal; and a third NOR gate coupled to receive said second flip-flop signal and said third flip-flop signal, for generating said start signal to said counter by logically combining said second and said third flip-flop signal.

4. The circuit as claimed in claim 3, wherein said signal output generator comprises:

gating means coupled to receive said gating clock signal and said second and third ones of said strobe control signals, for successively generating first, second, third, and fourth ones of said strobe signals in response to reception of said gating clock signal and second and third ones of said strobe control signals, each one of the first, second, third, and fourth strobe signals having a length determined by said gating clock signal.

5. The circuit as claimed in claim 4, wherein said strobe controller comprises:

a second inverter coupled to receive said gating clock signal, for providing an inverted gating clock signal by inverting said gating clock signal;

s a fourth flip-flop for generating said second one of said strobe control signals and a first feedback signal, said fourth flip-flop having a clock terminal coupled to receive said inverted gating clock signal and a data terminal coupled to receive said first feedback signal;

a fifth flip-flop for generating said third one of said strobe control signals and a second feedback signal said fifth flip-flop having a clock terminal coupled to receive said first feedback signal and a data terminal coupled to receive said second feedback signal; and a sixth flip-flop having a clock terminal coupled to receive said second feedback signal and a data terminal coupled to receive said predetermined voltage, for generating said first one of said strobe control signals by latching said predetermined voltage in response to reception of said second feedback signal.

6. The circuit as claimed in claim 5, wherein said signal output generator receives said gating clock signal and said strobe control signals, for successively generating first, second, third, and fourth ones of said strobe signals in response to said strobe control signals.

7. The circuit as claimed in claim 1, wherein said signal output generator receives said gating clock signal and said strobe control signals, for successively generating first, second, third, and fourth ones of said strobe signals in response to said strobe control signals.

8. A circuit for generating strobe signals to a plurality of one line light emitting diode arrays in a light emitting diode print head, said circuit comprising:

first means for generating first and second start signals;

second means for generating a comparator signal said second means comprising a counter for generating a counter signal by counting a number of clock pulses of a clock signal in dependence upon said second start signal, a strobe period selector for generating strobe period selection signals indicative of a selected period of said strobe signal, and a comparator for generating said comparator signal by comparing said counter signal with said strobe period selection signals indicative of a selected period of said strobe signals;

third means coupled to receive said first start signal and said clock signal, for generating a gating clock signal for controlling respective lengths of said strobe signals by latching said comparator signal in dependence upon said clock signal upon reset by said first start signal;

fourth means coupled to receive said gating clock signal and strobe control signals, for generating individual ones of said strobe signals in response to said strobe control signals to control operation of the light emitting diode arrays in the light emitting diode print head, said individual ones of said strobe signals having lengths determined by said gating clock signal; and fifth means coupled to receive said gating clock signal, for generating said strobe control signals by successively latching said gating clock signal in dependence upon said first start signal to control successive generation of said strobe signals.

9. The circuit as claimed in claim 8, wherein said first means comprises:

a first NOR gate coupled to receive a start pulse and a first one of said strobe control signals, for generating a first intermediate signal by logically combining said start pulse and said first one of said strobe control signals;

a first flip-flop having a reset terminal coupled to receive said first intermediate signal, a data terminal coupled to receive a predetermined voltage and a clock terminal coupled to receive a synchronizing signal, for generating said first start signal and a complementary first start signal by latching said predetermined voltage in accordance with a synchronization signal upon reset by said first intermediate signal; and a second NOR gate coupled to receive said complementary first start signal and a second intermediate signal, for generating said second start signal by logically combining said complementary first start signal and said second intermediate signal.

10. The circuit as claimed in claim 9, wherein said third means comprises:

a first inverter coupled to receive said clock signal, for generating an inverted clock signal by inverting said clock signal;

a second flip-flop having a clock terminal coupled to receive said inverted clock signal, a data terminal coupled to receive said comparator signal and a reset terminal coupled to receive said first start signal, for generating a third intermediate signal by latching said comparator signal in accordance with said inverted clock signal upon reset by said first start signal;

a third flip-flop having a clock terminal coupled to receive said clock pulses, a data terminal coupled to receive said third intermediate signal and a reset terminal coupled to receive said first start signal, for generating said second intermediate signal by latching said third intermediate signal in accordance with said clock signal upon reset by said first start signal; and a third NOR gate coupled to receive said second and third intermediate signals, for generating said gating clock signal by logically combining said second and third intermediate signals.

11. The circuit as claimed in claim 10, further comprised of said fourth means being coupled to receive said gating clock signal, and second and third ones of said strobe control signals, for successively generating first, second, third, and fourth ones of said strobe signals in response to said second and third ones of said strobe control signals, each one of the first, second, third, and fourth strobe signals having a length determined by said gating clock signal.

12. The circuit as claimed in claim 11, wherein said fifth means comprises:

a second inverter coupled to receive said gating clock signal for providing an inverted gating clock signal by inverting said gating clock signal;

a fourth flip-flop having a clock terminal coupled to receive said inverted gating clock signal, a data terminal coupled to receive a first feedback signal and a reset terminal coupled to receive said first start signal, for generating said second one of said strobe control signal and said first feedback signal by latching said first feedback signal in accordance with said inverted gating clock signal upon reset by said first start signal;

a fifth flip-flop having a clock terminal coupled to receive said first feedback signal, a data terminal coupled to receive a second feedback signal and a reset terminal coupled to receive said first start signal, for generating said third one of said strobe control signal and said second feedback signal by latching said second feedback signal in accordance with said first feedback signal upon reset by said first start signal; and a sixth flip-flop having a clock terminal coupled to receive said second feedback signal, a data terminal coupled to receive said predetermined voltage and a reset terminal coupled to receive said first start signal, for generating said first one of said strobe control signal by latching said predetermined voltage in accordance with said second feedback signal upon reset by said first start signal.

13. The circuit as claimed in claim 9, wherein said fifth means comprises:

an inverter coupled to receive said gating clock signal, for providing an inverted gating clock signal by inverting said gating clock signal;

a first flip-flop having a clock terminal coupled to receive said inverted gating clock signal, a data terminal coupled to receive a first feedback signal and a reset terminal coupled to receive said first start signal, for generating a second one of said strobe control signal and said first feedback signal by latching said first feedback signal in accordance with said inverted gating clock signal upon reset by said first start signal;

a second flip-flop having a clock terminal coupled to receive said first feedback signal, a data terminal coupled to receive a second feedback signal and a reset terminal coupled to receive said first start signal, for generating a third one of said strobe control signal and said second feedback signal by latching said second feedback signal in accordance with said first feedback signal upon reset by said first start signal; and a third flip-flop having a clock terminal coupled to receive said second feedback signal, a data terminal coupled to receive said predetermined voltage and a reset terminal coupled to receive said first start signal, for generating said first one of said strobe control signal by latching a predetermined voltage in accordance with said second feedback signal upon reset by said first start signal.

14. A method for generating strobe signals to a plurality of one line light emitting diode arrays in a light emitting diode print head, said method comprising the steps of:

generating first and second start signals in response to a start pulse, an end-output control signal and a synchronizing signal;

generating a counter signal by counting a number of clock pulses in dependence upon said second start signal;

generating a comparator signal by comparing said counter signal with strobe period selection signals indicative of a selected period of said strobe signals;

generating a gating clock signal for controlling respective lengths of said strobe signals by latching said comparator signal in dependence upon said first start signal;

generating in succession individual ones of said strobe signals in response to strobe control signals to control operation of the light emitting diode arrays in the light emitting diode print head, said individual ones of said strobe signals having respective lengths determined by said gating clock signal; and generating said strobe control signals to control generation of said strobe signals and said end-output control signal to initiate generation of said first and second start signals by latching said gating clock signal in dependence upon said first start signal.

15. A circuit for generating strobe signals to a plurality of one line light emitting diode arrays in a light emitting diode print head, said circuit comprising:

a first logic gate coupled to receive a start pulse and an end-output signal, for generating a first logic signal by logically combining said start pulse and said end-output signal;

a first flip-flop having a clock terminal coupled to receive a synchronization signal, a data terminal coupled to receive a predetermined voltage and a reset terminal coupled to receive said first logic signal, for generating a first start signal and a complementary first start signal by latching said predetermined voltage in accordance with said synchronization signal upon reset by said first logic signal;

a second logic gate coupled to receive said complementary first start signal and a second logic signal, for generating a second start signal by logically combining said complementary first start signal and said second logic signal;

a counter coupled to receive said second start signal and clock pulses, for generating a counter signal by counting said clock pulses in response to said second start signal;

a strobe period selector for generating strobe period selection signals for controlling the length of the strobe signals, said strobe period selection signals being indicative of a selected period of said strobe signals;

a comparator coupled to receive said counter signal and said strobe period selection signals, for generating a comparator signal by comparing said counter signal and said strobe period selection signals;

a second flip-flop having a clock terminal coupled to receive inverted clock pulses, a data terminal coupled to receive said comparator signal and a reset terminal coupled to receive said first start signal, for generating a third logic signal by latching said comparator signal in accordance with said inverted clock pulses upon reset by said first start signal;

a third flip-flop having a clock terminal coupled to receive said clock pulses, a data terminal coupled to receive said third logic signal and a reset terminal coupled to receive said first start signal, for generating said second logic signal by latching said third logic signal in accordance with said clock pulses upon reset by said first start signal;

a third logic gate coupled to receive said second and third logic signals, for generating a gating clock signal for controlling respective lengths of said strobe signals by logically combining said second and third logic signals;

means coupled to receive said gating clock signal and strobe control signals, for successively generating first, second, third, and fourth ones of said strobe signals in response to said strobe control signals to control operation of said light emitting diode print head, each one of the first, second, third, and fourth strobe signals having a length determined by said gating clock signal;

an inverter coupled to receive said gating clock signal, for generating an inverted gating clock signal by inverting said gating clock signal;

a fourth flip-flop having a clock terminal coupled to receive said inverted gating clock signal, a data terminal coupled to receive a first feedback signal and a reset terminal coupled to receive said first start signal, for generating a first one of said strobe control signals and first feedback signal by latching said first feedback signal in accordance with said inverted gating clock signal upon reset by said first start signal;

a fifth flip-flop having a clock terminal coupled to receive said first feedback signal, a data terminal coupled to receive a second feedback signal and a reset terminal coupled to receive said first start signal, for generating a second one of said strobe control signals and said second feedback signal by latching said second feedback signal in accordance with said first feedback signal upon reset by said first start signal, said first and second strobe control signals controlling successive generation of said first, second, third, and fourth ones of said strobe signals; and a sixth flip-flop having a clock terminal coupled to receive said second feedback signal, a data terminal coupled to receive a predetermined voltage and a reset terminal coupled to receive said first start signal, for generating said end-output signal by latching said predetermined voltage in accordance with said second feedback signal upon reset by said first start signal to initiate generation of said first logic signal.

16. The circuit as claimed in claim 15, wherein said first, second, third, fourth, fifth and sixth flip-flops are D flip-flops.

17. The circuit as claimed in claim 15, wherein said first, second and third logic gates are NOR gates.

18. The circuit as claimed in claim 15, wherein said strobe signals generating means receives said gating clock signal and said strobe control signals, for successively generating first, second, third, and fourth ones of said strobe signals in response to said strobe control signals.

19. A method for generating a plurality of strobe signals for controlling operation of a print head, said method comprising the steps of:

generating a counter signal by counting a number of clock pulses in dependence upon a start signal;

generating a comparator signal by comparing said counter signal with a strobe period selection signal representative of a selected period of said strobe signals;

generating a gating clock signal for controlling length of each of said plurality of strobe signals by latching said comparator signal;

generating in succession individual ones of said strobe signals in response to strobe control signals to control operation of said print head, said individual ones of said strobe signals having lengths determined by said gating clock signal; and generating said strobe control signals by successively latching said gating clock signal to control successive generation of said strobe signals.

20. A circuit for generating a plurality of strobe signals for controlling a light emitting diode print head, said circuit comprising:

counter means for generating a counter signal by counting clock pulses in response to start signals;

strobe period selector means for generating a plurality of strobe period selection signals each representing a selected period of said strobe signals for controlling the length of said strobe signals;

comparator means for generating a comparator signal by comparing said counter signal and said strobe period selection signals;

clock controller means for generating a gating clock signal for controlling the length of said strobe signals by latching said comparator signal in dependence upon said start signals;

output means for successively generating individual ones of said strobe signals in response to strobe control signals to control operation of said light emitting diode print head, said individual ones of said strobe signals having respective lengths determined by said gating clock signal; and strobe controller means for generating said strobe control signals by latching said gating clock signal in dependence upon said start signals to control successive generation of said strobe signals.

21. The circuit as claimed in claim 20, wherein said clock controller means comprises:

a first inverter coupled to receive said clock pulses, for providing inverted clock pulses by inverting said clock pulses;

a second flip-flop having a clock terminal coupled to receive said inverted clock pulses, a data terminal coupled to receive said comparator signal and a reset terminal coupled to receive a second one of said start signals, for generating a third intermediate signal by latching said comparator signal in accordance with said inverted clock pulses upon reset by said first one of said start signals;

a third flip-flop having a clock terminal coupled to receive said clock pulses, a data terminal coupled to receive said third intermediate signal and a reset terminal coupled to receive said second one of said start signals, for generating said second intermediate signal by latching said third intermediate signal in accordance with said clock pulses upon reset by said second one of said start signals; and a third NOR gate coupled to receive said second and third intermediate signals, for generating said gating clock signal by logically combining said second and third intermediate signals.

22. The circuit as claimed in claim 21, further comprised of said output means being coupled to receive said gating clock signal, and said strobe control signals, for successively generating first, second, third, and fourth ones of said strobe signals in response to said strobe control signals, each one of the first, second, third, and fourth strobe signals having a length determined by said gating clock signal.

23. The circuit as claimed in claim 22, wherein said strobe controller means comprises:

a second inverter for providing an inverted gating clock signal by inverting said gating clock signal;

a third flip-flop having a clock terminal coupled to receive said inverted gating clock signal, a data terminal coupled to receive a first feedback signal and a reset terminal coupled to receive said second one of said start signals, for generating a first one of said strobe control signal and said first feedback signal by latching said first feedback signal in accordance with said inverted gating clock signal upon reset by said second one of said start signals;

a fourth flip-flop having a clock terminal coupled to receive said first feedback signal, a data terminal coupled to receive a second feedback signal and a reset terminal coupled to receive said second one of said start signals, for generating a second one of said strobe control signal and said second feedback signal by latching said second feedback signal in accordance with said first feedback signal upon reset by said second one of said start signals; and a sixth flip-flop having a clock terminal coupled to receive said second feedback signal, a data terminal coupled to receive a predetermined voltage and a reset terminal coupled to receive said second one of said start signals, for generating a third one of said strobe control signals by latching said predetermined voltage from said data terminal in accordance with said second feedback signal upon reset by said second one of said start signals, said third one of said strobe control signals controlling generation of said first and second start signals.

\* \* \* \* \*